ASYNCHRONOUS PULSE MULTIPLEXING
Filed Dec. 1. 1961
FIG. 1
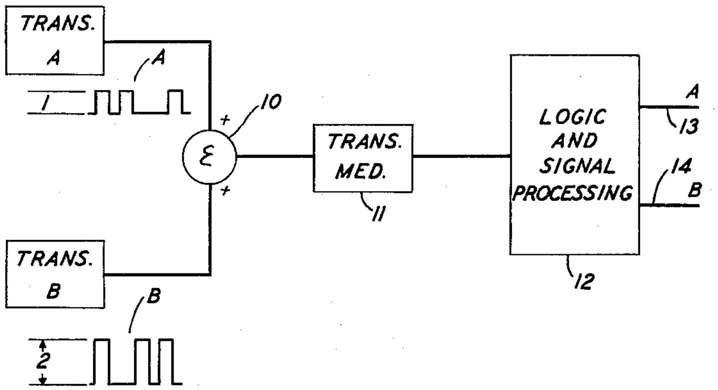
FIG. 2
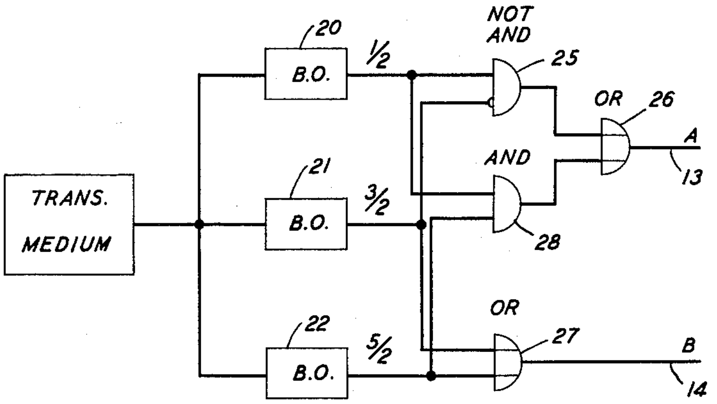
FIG. 3
| | ½ | 3/2 | 5/2 |
|---|---|---|---|
| A | 1 | 0 | 0 |
| B | 1 | 1 | 0 |
| A AND B | 1 | 1 | 1 |
INVENTORS: M. R. AARON
E. E. SUMNER
BY R. B. Ardis
ATTORNEY

United States Patent Office 3,261,919
Patented July 19, 1966

3,261,919
ASYNCHRONOUS PULSE MULTIPLEXING

Marvin R. Aaron, Whippany, and Eric E. Sumner, North Caldwell, N.J., assignors to Bell Telephone Laboratories, Incorporated, New York, N.Y., a corporation of New York

Filed Dec. 1, 1961, Ser. No. 156,211
2 Claims. (Cl. 179—15)

This invention relates to multiplex communication and more particularly to asynchronous pulse multiplexing systems in which the various transmitters whose pulse signals are to be multiplexed are independent of one another.

As is well known intelligence may be transmitted by means of pulse trains, and trains of binary pulses are frequently employed to carry information regarding data or an analog function such as speech. Frequently it is desired to transmit several such pulse trains over a common transmission medium and to separate the various pulse trains from the transmitted signal after reception. For the purpose of transmitting a plurality of pulse trains, each conveying intelligence, over a common transmission medium pulse multiplexing systems are employed. There are three classes of pulse multiplexing systems. The best known is synchronous multiplexing in which all the pulse transmitters have the same fundamental repetition frequency and multiplexing is accomplished by the time domain interleaving of pulses. To avoid the complexities of the distribution apparatus required at the receiver in synchronous systems the so-called semisynchronous system was devised in which pulse signals from each transmitter bear their own address and sorting is accomplished at the receiver by way of suitable recognition apparatus. In the third class of multiplexing systems the transmitters are independent of one another but each transmitter must transmit some relatively complex additional information in order to identify the signals from each of the transmitters at the receiving end of the system. The usual manner of sending this additional information is by having each transmitter generate a predetermined number of pulses at predetermined intervals of time and with a predetermined amplitude distribution. At the receiving end of such a system relatively complex equipment is needed to separate the signals emanating from the various transmitters.

It is an object of this invention to eliminate the necessity for generating relatively complex identifying information in an asynchronous pulse multiplexing system.

It is a related object of this invention to eliminate the necessity for relatively complex equipment to identify the signals from the transmitters at both the receiving and transmitting ends of the system.

In accordance with this invention differences in pulse height are used to identify the pulses emanating from each of the pulse transmitters. The pulse trains from the various transmitters are independent of one another in frequency and phase but have substantially the same pulse duration and a predetermined amplitude relationship must exist between the pulses. These pulse trains are added together at the transmitting end of the system to form a non-orthogonal sum of these pulse signals which is then transmitted over a transmission medium. At the receiving end of the system non-linear techniques are used to separate the pulses originating from the various transmitters.

This invention will be more fully comprehended from the following detailed description, taken in conjunction with the drawings, in which:

FIG. 1 is a block diagram of a multiplexing system embodying the invention;

FIG. 2 is a block diagram of the logic and signal processing equipment shown in FIG. 1; and FIG. 3 is a table of logic useful in understanding the operation of the logic circuitry shown in FIG. 2.

In the embodiment of the invention shown in FIG. 1 pulse signals emanating from transmitter A and transmitter B are added together to form a non-orthogonal signal. Transmitter A and transmitter B are totally independent of one another in that rate at which they generate pulses does not affect the operation of the system. Indeed, the rate at which each of them generates pulses may be determined by separate noise sources so that each transmitter generates pulses in response to its respective noise source and the pulses from one transmitter may or may not overlap pulses generated by the other transmitter when these pulses are considered in the time domain. In addition, these pulses are independent in that they are not separated in the frequency domain. As a result, the sum of the pulse signals emanating from transmitter A and transmitter B form a non-orthogonal signal at the output of adder 10. That is, the sum of the pulse signals form a signal which is separated neither in the time nor in the frequency domain. The only relationships required between the pulses emanating from transmitter A and transmitter B is that the pulses from each transmitter must have a fixed height and the amplitude of the pulses from one transmitter must bear a constant relationship to the pulses emanating from the second transmitter, and the pulses from both transmitters must have substantially the same width.

The non-orthogonal signal is applied to a transmission medium 11 which may be, for example, a frequency modulated transmitter which the non-orthogonal signal modulates. At the receiving end of the system a logic and signal processing circuit 12 is used to separate the pulse trains emanating from transmitter A and transmitter B so that pulse train A appears at output 13 and pulse train B appears at output 14.

The logic and signal processing circuit 12 is shown in block diagram form in FIG. 2. In order to make the operation of this invention easily understood the amplitude of the pulses emanating from transmitter B have in the illustrative embodiment been given an amplitude twice that of the pulses emanating from transmitter A, but it should be understood that this is not a limiting factor. Actually where the pulse signals from only two transmitters are to be multiplexed the amplitude of the pulses from the second transmitter need only exceed that of the first transmitter by a small value. At the receiving end of the transmission medium 11 the non-orthogonal signal which was transmitted is applied to the logic circuit 12. Logic circuit 12 comprises a first blocking oscillator 20 which generates an output pulse when the amplitude of the non-orthogonal signal is greater than one half the amplitude of a pulse emanating from transmitter A which is considered to have unity amplitude. The non-orthogonal signal is also applied to blocking oscillator 21 which generates a pulse output whenever the non-orthogonal signal applied to the blocking oscillator exceeds one and a half times the amplitude of the pulses emanating from transmitter A. Blocking oscillator 22, in a similar manner, generates a pulse output whenever the amplitude of the non-orthogonal signal is greater than two and a half times the amplitude of the pulses emanating from transmitter A.

Due to the fact that the pulses emanating from transmitter B are twice the amplitude of the pulses emanating from transmitter A the following logic applies:

When the input signal at any instant of time is greater than one half unity amplitude (the amplitude of pulse A) but less than three halves unity amplitude a pulse is present only from transmitter A.

When the input signal at any instant of time is greater than three halves unity amplitude but less than five halves unity amplitude a pulse is present only from transmitter B.

When the input signal at any instant of time exceeds five halves unity amplitude a pulse is present from transmitter A and a pulse is present from transmitter B.

The results of the above stated logic are shown graphically in FIG. 3 where a "1" represents a pulse and a "0" represents no pulse.

The logic circuitry shown in FIG. 2 separates and detects the pulses from the various transmitters in the following manner. When blocking oscillator 20 generates an output pulse in response to an input signal greater than one half unity amplitude then this pulse is applied to NOT-AND gate 25 whose output is applied through OR gate 26 to output terminal 13 indicating that a pulse from transmitter A is present at that instant of time. No other portion of the logic circuit shown in FIG. 2 is activated in response to that input signal. If, however, the input signal exceeds three halves as well as one half unity amplitude then NOT-AND gate 25 is inhibited by the pulse output of blocking oscillator 21 so that no output pulse appears at terminal 13. The output of the blocking oscillator 21 is, however, applied to terminal 14 through OR gate 27 to indicate that a pulse from transmitter B is present at that instant of time. AND gate 28 prevents the output of blocking oscillator 20 from passing through to output terminal 13 because the output of blocking oscillator 22 is not present to open AND gate 28. Finally, if the amplitude exceeds five halves then AND gate 28 is opened by the output of blocking oscillator 22 so that the pulse from blocking oscillator 20 passes through the AND gate 28 and OR gate 26 to the output of terminal 13. NOT-AND gate 25 remains closed due to the output of blocking oscillator 21, and OR gate 27 passes the output of blocking oscillator 22 to output terminal 14.

Thus in accordance with this invention the pulse signals to be multiplexed are totally independent of one another except that the pulses from the transmitters must be substantially the same width and those from one pulse train must bear a constant amplitude relationship to the pulses from the other pulse train. In the embodiment of the invention described above the pulses from the second pulse train had an amplitude twice that of the first pulse train and the logic and signal processing circuit 12 separated the pulses on this basis. It should be understood that the amplitude of the pulses from the second transmitter need only exceed those from the first transmitter by a small amount and they could have had another amplitude relationhsip to one another than two to one. The logic and signal processing circuit 12 could have, by suitable modification of the levels at which the blocking oscillators 20, 21 and 22 generated an output pulse, distinguished between the two pulse trains even if they differed in amplitude by only a small value. In addition, it should be recognized that more than two pulse trains may be multiplexed in the above-described manner. This, of course, requires more elaborate logic circuitry to distinguish the pulses emanating from each pulse train, and the pulses from each of the transmitters must have a different amplitude. Thus where three transmitters are to be multiplexed the pulse height might bear the amplitude relationships 1 to 2 to 4. Actually any amplitude relationship may be used provided each succeeding pulse height as expressed in the relationship is greater than the preceding pulse height, and each pulse height as expressed in the relationship must be greater than the sum of all succeeding heights.

It is to be understood that the above-described embodiments are illustrative of the application of the invention. Numerous other arrangements may be devised by those skilled in the art without departing from the spirit and scope of the invention.

What is claimed is:

1. In a system for asynchronously multiplexing information bearing pulse trains, two pulse transmitters each of which generates an information bearing pulse train which is independent of the pulse train generated by the other transmitter in both phase and frequency relationship but whose pulses have substantially the same pulse width as the pulses generated by the other transmitter with the amplitude of the pulses generated by a first of the pulse transmitters being one-half the amplitude of the pulses generated by the second of the pulse transmitters, means to add the pulse trains so that an overlapping sum of the pulse trains is produced, means to transmit the overlapping sum signal, a receiver to receive the transmitted signal, means at said receiver to generate a pulse at a first output terminal when the received signal is greater than one-half the amplitude of a pulse received from the first of the pulse transmitters but less than the amplitude of a pulse received from the second of the pulse transmitters, means to generate an output pulse at a second output terminal when the received signal is greater in amplitude than the amplitude of a pulse received from the first of the pulse transmitters but less than the amplitude of a pulse received from the second of the pulse transmitters, and means to generate an output pulse at said first and said second output terminals when the received signal is greater in amplitude than the amplitude of a pulse received from the second of the pulse transmitters.

2. In a system for asynchronously multiplexing information bearing pulse trains, two pulse transmitters each of which generates an information bearing pulse train which is independent of the pulse train generated by the other transmitter in both phase and frequency relationship but whose pulses have substantially the same pulse width as the pulses generated by the other transmitter with the amplitude of the pulses generated by a first of the pulse transmitters being one-half the amplitude of the pulses generated by the second of the pulse transmitters, means to add said pulse trains so that an overlapping sum of said pulse trains is produced, means to transmit the overlapping sum signal, a receiver to receive the transmitted signal, first, second and third amplitude responsive means for producing output signals only when the input signal applied to the input of said amplitude responsive means exceeds respectively 1, 3 and 5 times one-half the amplitude of the pulses received from the first pulse transmitter, connections from the output of the transmission medium to the inputs of said amplitude responsive means in parallel, first and second signal output circuits, means producing an output signal in said first output circuit in response to an output signal from said first amplitude responsive means only and to an output signal from said third amplitude responsive means while prohibiting an output signal to said first output circuit in response to output signals from said first and said second amplitude responsive means with no output signal from said third amplitude responsive means, and means for producing an output signal in said second output circuit in response to output signals from either said second or said third amplitude responsive means.

References Cited by the Examiner

UNITED STATES PATENTS

| | | | |
|---|---|---|---|
| 2,381,847 | 8/1945 | Ullrich | 179—15 |
| 2,425,066 | 8/1947 | Labin et al. | 179—15 |
| 2,434,922 | 1/1948 | Grieg | 179—15 |
| 2,510,066 | 6/1950 | Busignies | 179—15 |

DAVID G. REDINBAUGH, *Primary Examiner.*

R. L. GRIFFIN, *Assistant Examiner.*